March 19, 1929.　　　A. A. OSWALD　　　1,705,993

VOLTAGE LIMITING DEVICE

Filed Nov. 25, 1925

Inventor:
Arthur A. Oswald
by ──── Atty.

Patented Mar. 19, 1929.

1,705,993

UNITED STATES PATENT OFFICE.

ARTHUR A. OSWALD, OF EAST ORANGE, NEW JERSEY, ASSIGNOR TO BELL TELEPHONE LABORATORIES, INCORPORATED, OF NEW YORK, N. Y., A CORPORATION OF NEW YORK.

VOLTAGE-LIMITING DEVICE.

Application filed November 25, 1925. Serial No. 71,497.

This invention relates to signaling systems and more particularly to a method and means for limiting the voltage applied to a specific part of a transmission system.

In a transmission system, in order to attain a high transmission efficiency, it is necessary to use various elements included in the circuit at their maximum rated power. In order to do this and to prevent an excess voltage being applied to these elements when the power in the supply circuit is unexpectedly increased, particularly in the case of high power apparatus where such an overload would cause interruption of the service, it is desirable to employ a device for limiting the voltage applied to the power apparatus to a certain predetermined value irrespective of the voltage applied to the input side of the device.

In previously known systems, including voltage limiting devices adapted to limit to a predetermined value the voltage supplied to apparatus to be protected, the form of the voltage wave applied to the apparatus may be flat-topped, that is, of constant amplitude during the time the instantaneous value of the voltage supplied to the limiting device exceeds the desired value. As the flat-top wave is composed of a component of the applied frequency, having a maximum amplitude greater than the flat-top and various harmonics thereof, a wave of amplitude greater than the predetermined maximum will occur in a circuit which selects the wave of applied or fundamental frequency and rejects its harmonics.

A system of the above type will only limit the voltage applied to a load circuit provided this circuit does not discriminate against harmonic frequencies. The potential across the terminals of any circuit in the system selective of the fundamental will not be limited to the predetermined maximum, but will depend upon the length of the flat-top portion and the slope of the sides.

It is an object of this invention to permit transmission systems to be operated at all times at maximum transmission efficiency.

Another object is to limit to a predetermined maximum value the voltage of a wave applied to a circuit of the above mentioned character.

A further object is to limit to a predetermined value the amplitude of a wave of desired frequency in a transmission system.

These objects and others which will be apparent as the nature of the invention is disclosed are accomplished, in accordance with the present invention, by employing a voltage limiting device comprising two channels having different transmission characteristics to which the current to be regulated is applied. Each channel includes a space discharge device, the amplification characteristic of which may be adjusted within certain limits. The energy transmitted through the two channels is superimposed in an output circuit in such a manner that, as the instantaneous input voltage is increased, the voltage of the output wave increases up to a certain point and then continuously decreases. Hence, when the input voltage is greater than a given value, the resultant wave in the output circuit comprises a component of fundamental frequency and various components harmonically related thereto, but the amplitude of the component of fundamental frequency is always less than the predetermined maximum.

Although the novel features which are believed to be characteristic of this invention will be pointed out with particularity in the claims appended hereto, the invention itself, its objects and advantages, the manner of its organization and the mode of its operation will be better understood by referring to the following description taken in connection with the accompanying drawing forming a part thereof in which:

Figure 1:
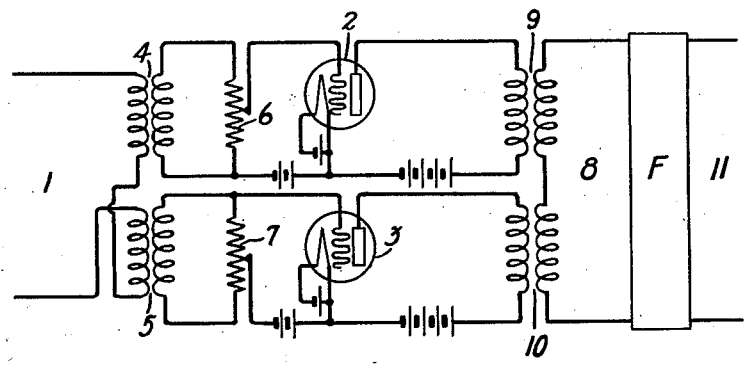
Fig. 1 shows diagrammatically one embodiment of this invention.

Referring to Fig. 1, circuit 1 represents the portion of the circuit supplying current to the two transmitting channels which cooperate to limit to a predetermined value the amplitude of the current supplied to a load circuit. Circuit 1 is coupled to the input circuit of space discharge devices 2 and 3 by means of transformers 4 and 5. Transformers 4 and 5 are so connected to circuit 1 and devices 2 and 3 that the potentials applied to the grids of these devices in response to a current in line 1 are in opposite phase.

Energy transferred to the input electrodes of the two space discharge devices is controlled by potentiometers 6 and 7, connected across the input circuits of space discharge devices 2 and 3, respectively. The ratio of the energy applied to the two devices is varied by adjusting the respective potentiometers 6 and 7, for the purpose to be hereinafter explained.

The anode-cathode circuits of space discharge devices 2 and 3, are coupled to an output circuit 8 by means of transformers 9 and 10. Filter F is adapted to pass to line 11, from circuit 8, currents of the desired frequency or frequency band, which in a practical case will be the frequency of the current supplied through the circuit 1, and to suppress components of other frequencies.

Figure 3:
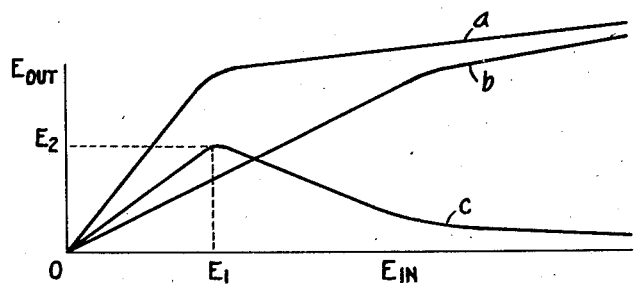
Fig. 3 shows a series of curves to be used in explanation of the operation of the systems shown in Figs. 1 and 2.

The operation of this system may be best understood by referring to the series of curves shown in Fig. 3. In that figure curves $a$ and $b$ represent the amplification characteristics of the two channels including space discharge devices 2 and 3, respectively, the voltage in the supply circuit being plotted against the voltage of the output circuit. By connecting the input circuits of the two channels in such a manner that the currents therein are mutually opposed, the transmission characteristic of the system, comprising the two channels, may be obtained by subtracting the ordinates of curve $b$ from the corresponding ordinates of curves $a$ which will produce a curve similar to that shown as curve $c$. Curve $c$ has a definite peak value which may be controlled by suitably choosing the constants of the amplifier channels 2 and 3 to produce amplification characteristics respectively represented by curves $a$ and $b$. The amplification characteristics of the channels may be controlled by potentiometers 6 and 7 or transformers 4 and 5 may be wound with a different ratio between the primary and secondary turns to effect this regulation.

It will be seen in curve $c$ that as the voltage $E_{in}$ applied to the input circuit, varies between the limits O and $E_1$ the voltage $E_{out}$ at the output terminals will be directly proportional to voltage $E_{in}$, but as the input voltage $E_{in}$ is increased beyond the value $E_1$ the voltage of the output circuit $E_{out}$ decreases. It is apparent therefore that, irrespective of the maximum value of voltage $E_{in}$, the maximum instantaneous value of the voltage $E_{out}$ may be limited by selecting proper constants for the two channels to produce the desired amplification characteristic, whereby the apparatus connected to the circuit 11 may be protected against instantaneous voltages greater than a desired limiting value.

If an alternating voltage having a maximum peak voltage less than $E_1$ is applied to line 1, a voltage having the same wave form will occur in circuit 8. If the peak voltage of the applied wave is greater than $E_1$ the voltage applied to the circuit 8 will no longer be of the same form as the applied wave and its peak will never exceed the limiting value determined by the amplification characteristics of the two channels. When the input voltage $E_{in}$ exceeds $E_1$, instead of a flat-top wave in line 8, such as that produced by previously known voltage limiting systems, a wave having a dip in its top portion will be present, due to the decrease in value of voltage $E_{out}$. As voltage $E_{in}$ is increased beyond $E_1$ the dip will be greater. Thus the voltage wave in the circuit 8 will consist of a component of frequency corresponding to the impressed wave, the maximum amplitude of which is limited to the predetermined value, and components harmonically related thereto.

The amplitude of the harmonics depends upon the amount by which the maximum value of potential $E_{in}$ exceeds voltage $E_1$ and the constants of the amplification channels. Hence, if the constants are properly selected, when the amplitude of voltage $E_{in}$ is increased to a certain value, the voltage of the fundamental frequency in the output circuit becomes a maximum and then decreases, but as the voltage $E_{in}$ is further increased only the harmonics are increased in amplitude. By employing in line 8 means selective of the fundamental frequency there may be applied to the load circuit 11 and apparatus connected thereto, an undistorted voltage wave of the applied frequency, the maximum value of which is fixed and independent of the voltage applied to the limiting device over line 1.

By suitably selecting values of voltages $E_{in}$ and $E_1$ the third harmonic may be made predominant. If means selective of the third harmonic is included in line 11 this arrangement may be used to produce a wave of frequency triple that of the wave supplied over the line 1.

Figure 2:
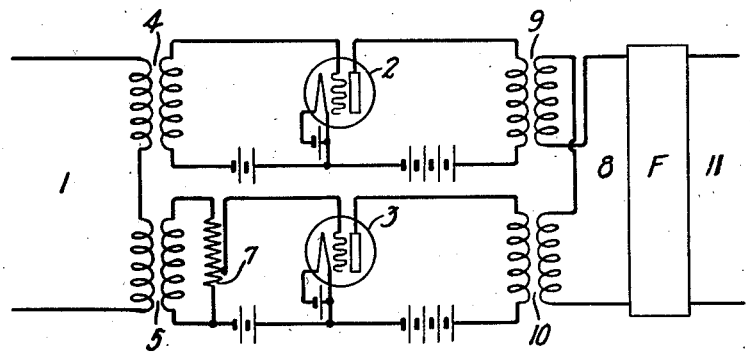
Fig. 2 illustrates a different form thereof.

In the system shown in Fig. 2, elements corresponding to those disclosed in Fig. 1 are identified by similar reference numerals. In Fig. 2 transformers 4 and 5 are connected to apply potentials in the same phase to the grids of devices 2 and 3, and transformers 9 and 10 are connected so that potentials applied to the circuit 8 from the two transformers are opposed or in opposite phase. Filter F is used to select currents of a definite frequency in circuit 8 and apply them to line 11 in a manner similar to that described in connection with Fig. 1.

The operation of the circuit in Fig. 2 is similar to that of Fig. 1, inasmuch as two channels are connected in opposing relationship to circuit 8. Consequently the explanation of operation of Fig. 1 given above, applies to the system shown in Fig. 2.

Although this invention has been shown and described as applied to a particular system, it is not to be limited thereto but only in accordance with the scope of the following claims.

What is claimed is:

1. In a voltage limiting system comprising a pair of space discharge devices, each having a cathode, an anode, and a control electrode, an incoming circuit, an outgoing circuit, means for giving the system an overall transmission characteristic such that as the instantaneous input voltage is increased, the output voltage increases for a normal range of values of input voltage and decreases with larger input voltages, said means comprising connections for establishing two transmission paths between said circuits, said paths having individual input circuits, means to give the two paths respectively, different transmission characteristics, means to impress signaling impulses from said incoming circuit upon the individual input circuits of said paths in differential phase relationship, and means to impress impulses from said paths upon said outgoing circuit in additive phase relationship.

2. In a voltage limiting system comprising a pair of space discharge devices, each having a cathode, an anode, and a control electrode, said devices having independent input circuits, an incoming circuit, an outgoing circuit, connections for establishing two transmission paths between said input and said output circuits, means to adjust one path to have different characteristics from the other, means for impressing signaling impulses in a reversed sense between similar electrodes of said discharge devices, means for impressing the output of said devices on said outgoing circuit in additive phase relationship, and a filter in the outgoing circuit for transmitting the fundamental frequency of said signaling impulses while suppressing harmonics of said fundamental frequency.

3. A voltage limiting circuit comprising a pair of space discharge devices each having a cathode, an anode and a grid or control element, an incoming circuit, an outgoing circuit, connections for establishing two transmission paths between said input and said output circuits, means to adjust one path to have different characteristics from the other, certain of said connections being reversed in the respective paths giving a resultant transmission characteristic representing the difference between the individual characteristics of said paths, whereby waves of a fundamental frequency in the incoming circuit exceeding a predetermined maximum are repeated in to the outgoing circuit with reduced amplitude, and a filter in the outgoing circuit for transmitting the fundamental while suppressing components of other frequencies.

In witness whereof, I hereunto subscribe my name this 11th day of November, A. D., 1925.

ARTHUR A. OSWALD.